April 21, 1925.
T. E. MURRAY, JR
AXLE HOUSING
Filed Feb. 18, 1925
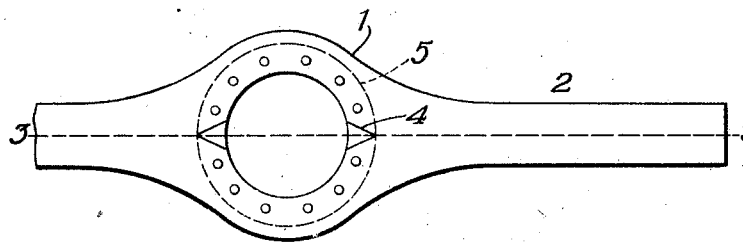
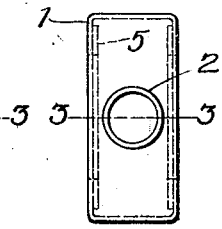
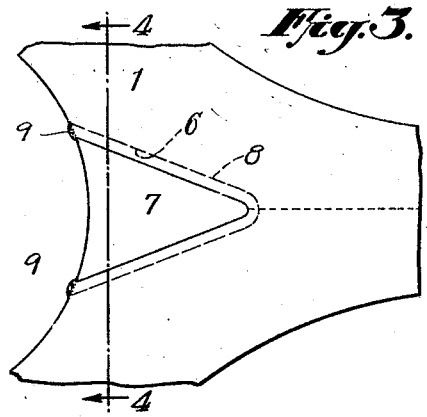
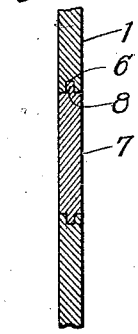
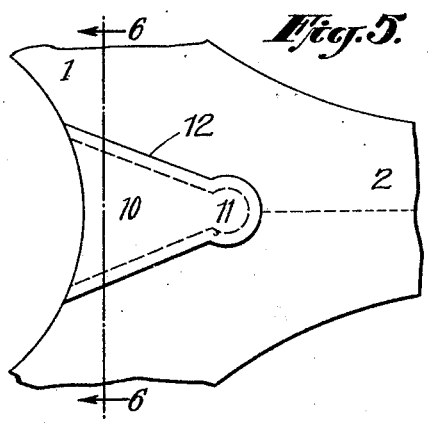
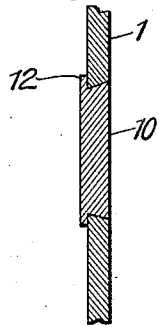
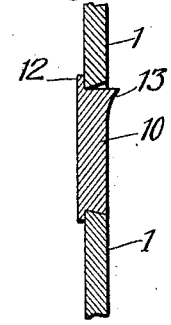
Inventor
Thomas E. Murray, Jr.
By His Attorney Patented Apr. 21, 1925.

1,534,605

UNITED STATES PATENT OFFICE.

THOMAS E. MURRAY, JR., OF BROOKLYN, NEW YORK.

AXLE HOUSING.

Application filed February 18, 1925. Serial No. 9,937.

*To all whom it may concern:*

Be it known that I, THOMAS E. MURRAY, Jr., a citizen of the United States, and resident of Brooklyn, county of Kings, and State of New York, have invented certain new and useful Improvements in Axle Housings, of which the following is a specification.

In a patent of Thomas E. Murray and myself No. 1,451,401 of April 10, 1923, there is described an axle housing which can be made most economically from blanks of such shape that when united there are approximately triangular gaps at the inner ends of the joints, into which gaps fillers may be introduced. The present invention aims to provide an alternative scheme for inserting and holding such fillers. The invention may be applied also in various analogous constructions. The accompanying drawings illustrate an embodiment of the invention.

Fig. 1 is an elevation of an axle housing with one end broken off;

Fig. 2 is an end elevation of the same;

Fig. 3 is a side elevation of a filler and adjacent parts;

Fig. 4 is a section of the same on the line 4—4 of Fig. 3;

Fig. 5 is a side elevation of another design of filler and the adjacent parts;

Fig. 6 is a section of the same on the line 6—6; and

Fig. 7 is a similar section showing the parts before they are united.

Referring to the embodiment of the invention illustrated, the housing comprises a central enlargement 1 of approximately annular shape with a transverse opening through which the gearing within is made accessible; tubular portions 2 for the axles being extended from opposite sides of the enlargement.

In making the housing, segmental blanks are used one constituting the upper, and the other the lower, part of the housing. Two such segments are placed edge to edge and united along the line 3—3, preferably by welding.

The blanks are of such shape that their meeting edges diverge at their inner ends, leaving approximately triangular gaps 4. Preferably, though not necessarily, reinforcing rings 5 are fastened on the inner faces of the flanges of the central enlargement, and extend continuously across the triangular gaps.

According to Figs. 3 and 4, the blanks are formed with grooves 6 along the edges of the gap and a filling piece 7 is provided with tongues 8 entering such grooves. Owing to the triangular shape of the gap, the fillers can be inserted from the wider end and forced firmly into engagement with the grooved edges of the segments. They may be fastened therein by various means, such for example as by arc welding at the inner ends of the line of engagement as shown by the deposited metal 9.

According to Fig. 5, the edges of the gap are rounded or laterally extended at the apex and the filler 10 has a correspondingly rounded end 11 which by its engagement with the edges of the blanks prevents the movement of the filler endwise out of the gap. The filler may be locked into engagement laterally in various ways. In Fig. 7 I have shown the filler 10 with triangular grooves in its opposite edges embracing the correspondingly shaped edges of the parts 1 of the segments. Thus there is the lateral overlapping of the parts the same as in Fig. 4 and there is an endwise overlapping due to the enlargement 11 on the end of the filler and the correspondingly widened portions of the segmental blanks.

This filler cannot be shoved endwise into place, but is initially shaped so as it can be inserted sidewise and the parts then swaged to provide the lateral overlap. As shown in Fig. 7, the part 10 has flanges 12 overlapping the face of the segments 1. One of the edges of the filler is shaped with a wide open groove to permit the insertion of the filler from one side and has an excess of metal as shown at 13 which, after the insertion of the filler, is swaged down against the edge of the part 1 so as to embrace the latter as in Fig. 6.

Where the filler is made thicker than the segments, as in Fig. 6, it is preferably arranged to bring its outer face flush with the outer face of the adjacent parts of the housing.

Though I have described with great particularity of detail certain embodiments of my invention, yet it is not to be understood therefrom that the invention is restricted to the particular embodiments disclosed. Various modifications may be made by those skilled in the art without departure from the invention as defined in the following claims.

What I claim is:—

1. An axle housing or the like formed of segments united along their edges and forming a gap at an end of such edges and a filler in said gap having a grooved engagement with the edges of the segments to prevent lateral separation.

2. An axle housing or the like formed of segments united along their edges and forming a gap at an end of such edges and a filler in said gap having a grooved engagement with the edges of the segments to prevent lateral separation, said filler being also fastened to the segments to prevent endwise separation.

In witness whereof, I have hereunto signed my name.

THOMAS E. MURRAY, Jr.